INVENTORS
ROBERT P. COX
LUTHER L. YAEGER and
RALPH W. BUETOW
BY
Oscar L. Spencer
ATTORNEY United States Patent Office 2,788,306
Patented Apr. 9, 1957

2,788,306

SURFACE TREATMENT OF HALOGENATED FLUOROETHYLENES AND LAMINATES THEREOF

Robert P. Cox, Luther L. Yaeger, and Ralph W. Buetow, Madison, Wis., assignors to Pittsburgh Plate Glass Company Application March 24, 1953, Serial No. 344,398

27 Claims. (Cl. 154—139)

This invention relates to an improved method for treating the surfaces of certain non-polar substances to render them suitable for adhesion to other substances and to various practical applications thereof, such as applying a superior thin non-corrosive coating to surfaces of substances that are subject to chemical attack upon exposure to certain reagents and/or atmospheric conditions, thereby making possible an improved container for corrosive reagents and, in addition, providing a novel laminated structure hitherto impossible.

It has been discovered that certain non-polar compounds, particularly certain halogenated polyethylenes, are especially resistant to corrosion due to their extreme resistance to physical and chemical changes. These characteristics render these substances likely for use as corrosion-resistant coatings for other materials subject to corrosion. However, these non-polar compounds have not been adhered adequately to other substances heretofore by means of conventional adhesives nor have they been effectively bonded to other materials except under conditions of high temperatures and pressures wherein the materials being coated are subject to physical or chemical change deleterious to the material before the bond is effected. Hence, these non-polar compounds have never been utilized previously to their fullest capabilities.

Accordingly, it is an object of the present invention to provide a method for imparting a protective coating to the surface of a material subject to chemical corrosion.

Another object of the present invention is to provide a method of treating certain organic substances to render them amenable for adhesive bonding by means of presently known adhesives to the surface of other substances.

Still another object of the present invention is to provide laminated articles, the laminations of which are firmly bonded by the method taught by the present invention.

It is still another object of the present invention to provide a novel container for corrosive materials wherein the teachings of the present invention are utilized to provide a non-corrosive coating for the container.

These and other objects of the present invention will become apparent upon further study of the following description. It is to be understood, however, that the description contained herein is for purposes of illustration only, and that the scope of the invention is limited only by the extent of the appended claims.

Figure 1:
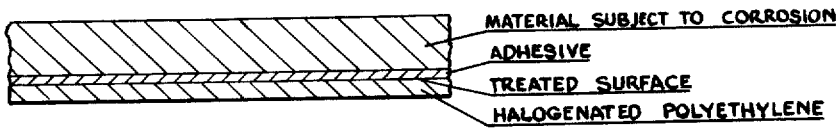
Figure 2:
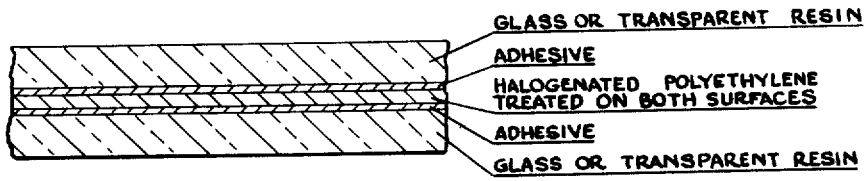
Figure 3:
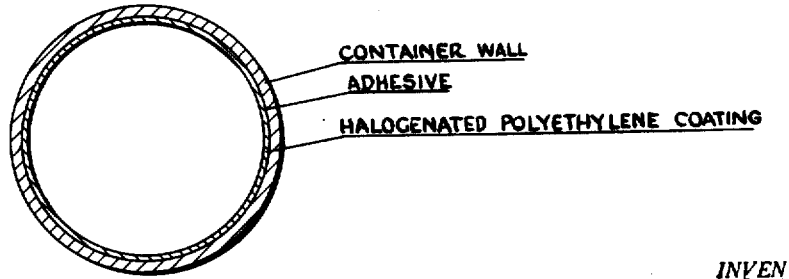

In the drawing, which is to be considered part of the description of this invention, Figure 1 discloses a cross-sectional view of one practical application of the present invention wherein a polymeric halogenated ethylene, not subject to corrosion and comprising no less than two nor more than three fluorine atoms per monomer, is treated on one surface in accordance with the teachings of the present invention to enable that surface to be adhered to an exposed surface of a material that its subject to corrosion, Figure 2 discloses a cross-sectional view of another practical embodiment of the present invention wherein a sheet of a polymeric halogenated compound such as depicted in Figure 1 is rendered suitable for use as an interlayer for a laminated window closure comprising two sheets of either glass or a transparent synthetic material by treating both surfaces of the interlayer in accordance with the teachings of the present invention, thereby rendering it possible to adhere both surfaces of the interlayer in accordance with the teachings of the present invention, i. e., thereby rendering it possible to adhere both surfaces of the halogenated polyethylene compound to individual sheets of the transparent material by means of a suitable adhesive, and Figure 3 represents a cross-sectional view of another practical embodiment of the present invention, namely, a container for corrosive reagents such as fuming nitric acid, wherein at least the inner surface of the container is coated with a halogenated polyethylene in accordance with the teachings of the present invention.

It has been discovered that by modification of their surfaces, certain halogenated polyethylenes having the general formula $(-C_2F_nX_{4-n}-)_m$, where $m$ is any whole number, $n$ equals 2 or 3 and X represents a halogen other than fluorine, can be adhered to other substances by treatment with amino-compounds of the class consisting of amino-compounds containing unsaturated groups capable of polymerizing into an adhesive and amino-compounds containing reactive groups capable of subsequent reaction with presently known adhesives that this preferred class of halogenated polyethylenes may be effectively bonded to other materials to provide a suitable protective coating against chemical corrosion.

It has been discovered that many of the effective adhesives for these substances contain traces of amine catalysts. The adhesion was found to vary directly as the amine concentration and was thus attributed to the reaction of the amine with the surface. Polyaminoalkyl methacrylates and amine-neoprene mixtures were found to be excellent specific adhesives for bonding these substances to methacrylate sheets.

In order to devise a more general treatment, it was discovered that by reacting a surface of halogenated polyethylene with an amine which could later react further with a wide variety of conventional adhesives, the halogenated ethylene polymer can be adhered to a wide variety of substances including glass, polymethyl methacrylate (Lucite), polymethyl alpha chloro acrylate (Gafite), cellulosic materials, such as wood and metals, such as aluminum.

Among the amino-compounds suitable for use in rendering these halogenated monomers of polyethylene containing not more than 3 nor less than 2 fluorine atoms per monomer suitable for use with adhesives are the following amines: hydroxy alkyl amines such as ethanolamine, butanolamine, butanol diamine, butanol triamine, propanolamine, propanol diamine, etc.; also vinyl melamines; also allyl melamines such as diallyl melamine, chloroallyl melamine; also diamino compounds such as diamino ethane, diamino propane, diamino butane, diamino isopropane, diamino hexane, etc.; also the pyridines such as vinyl pyridine, 2-vinyl pyridine, 3-vinyl pyridine; also the vinyl morpholines including 2-vinyl morpholine and 3-vinyl morpholine as well as the piperidines such as vinyl piperidine, 2-vinyl piperidine, 3-vinyl piperidine, etc.; also compounds containing $n$ ethylene groups and $n+1$ amine groups such as ethylene diamine, diethylene triamine, triethylene tetramine, tetraethylene pentamine, etc.

Other compounds containing suitable amino groups include various amine polymers having the general formula

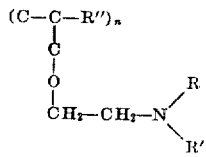

where R and R' may be hydrogen, aliphatic or aromatic radicals and R'' may be hydrogen or methyl, bromine, chlorine or fluorine. Examples may include amino methacrylates and acrylates such as polymerized 2-aminoethyl methacrylate. Also included in the above examples are copolymers of the above type compound with each other or with other compounds of the above group or methyl methacrylate or methyl acrylate.

It has also been noted that mixtures of halogen-containing polymers and polyamines possess excellent adhesion to the halogen-substituted polyethylenes recited above. Examples of certain of the halogen-containing polymers used to formulate these mixtures include neoprene (chloroprene), Hycar PA rubbers (copolymers of beta chloroethyl acrylate and vinyl 2-chloroethyl ether with alkyl acrylates), poly beta chloroethoxy ethyl acrylate, poly beta chloroethyl acrylate, and copolymers of $C_2F_nX_{4-n}$ type of compounds, where $n$ is 2 or 3 and X is a halogen, with any of the above materials. In fact, any polymeric compound can be put in the class of halopolymers by halogenation with $SOX_2$, $X_2$, $SO_2X_2$, where X is a halogen. It is noted that any halogen containing compound is suitable, such as vinyl or vinylidene fluoride, chloride, bromide or iodide. In addition, fluoro esters may also be used: e. g., poly beta chloro allyl heptafluoro butyrate, etc.

In this connection, the term "polyamines," in addition to relating to conventionally listed polyamines such as hexamethylene diamine, diethylene triamine, tetraethylene pentamine, etc., is meant to include oxidation products of amines, such as nitroso compounds.

The halogenated polyethylenes that are modified by the amine treatments listed above include poly trifluoro chloro ethylene, poly trifluoro bromo ethylene, poly trifluoro iodo ethylene, poly difluoro dichloro ethylene, poly difluoro dibromo ethylene, poly difluoro diiodo ethylene, poly difluoro chloro bromo ethylene, poly difluoro chloro iodo ethylene and poly difluoro bromo iodo ethylene.

One of the aforementioned materials which is most suitable and presently available for use as a protective coating is polychlorotrifluoroethylene, known more commonly under the names Trithene or Kel-F. While this substance is impervious to chemical reaction with most reagents, its use as a protective coating has been limited in the past due to the inability of the material to be bonded to substances liable to corrosion.

Most any commercially available adhesive may be used to bond a treated halogenated ethylene surface to the surface of another substance. Typical adhesives suitable for use are disclosed in Patent No. 2,464,826 to Neher and Bauer. This patent teaches the use of acrylate adhesives. It is also understood that crotonate, methacrylate, alpha chloroacrylate, sorbate and fumarate adhesives are also suitable as well as other commercial types of adhesives, may be utilized as well as those disclosed in the aforementioned patent.

It is believed that the substitution of a fluorine atom for a hydrogen in an ethylene compound results in such a strong bond that the fluorine cannot be removed. It has been repeatedly demonstrated in the laboratory that a completely fluorinated ethylene ($C_2F_4$) will not react. Prior to the present invention, it had been considered impossible to react any halogen substituted ethylene, even those containing 2 or 3 fluorine atoms substituted for the hydrogens. However, the bond formed by a chlorine, bromine or iodine substituted atom has been found to be capable of substitution by means of an amine group to the polymerized fluorinated ethylene monomers. The presence of the fluorine atoms in these monomers provides a compound that is not susceptible of further reaction once the other halogens have reacted. The compounds containing the amino-groups or phosphite groups capable of substitution in lieu of the halogens other than fluorine in the halogenated monomers of polyethylene also contain other reactive groups capable of forming a bond with an adhesive either by polymerization with an adhesive or by chemical reaction.

The following materials and treatments provided good adhesion properties to Trithene:

Polyamide Resin No. 100-S (General Mills) a product of an incomplete reaction of a dibasic acid such as adipic acid and $H_2-N-C_2H_4-NH-C_2H_4-NH_2$
Poly-n-hexy methacrylate
Hycar PA–4001 (Goodrich) mixed with an amine
Butyl Rubber GRI–15 (Enjay)
Beta-chloroethoxy ethyl methacrylate with triethylene tetramine
Poly amino methacrylates Except for the polymethacrylate and Butyl rubber adhesives whose strengths were comparatively weak, most of these substances contain either amino groups or free amines. Furthermore, the degree of adhesion attained varied directly with the amine concentration.

The present invention contemplates the use of an amine for pretreating the surface of certain halogenated polyethylenes and making it receptive to available adhesives for different types of material rather than utilizing a specific adhesive for each different type of material requiring a protective coating.

The amine-containing compounds capable of producing the desired results are susceptible of classification into two groups: one containing unsaturated groups capable of polymerization into an adhesive, and including such compounds as diallyl amine, vinyl pyridine, diallyl melamine, etc.; and the other containing reactive groups capable of subsequent reaction with an adhesive, and including such amines as ethanol amine, diethanol amine, ethylene diamine, diallyl melamine, etc.

It is noted that diallyl melamine contains both unsaturated groups and reactive amino groups. Best results were obtained using an alkaline solution of N,N diallyl melamine to treat the surface of the halogenated ethylenes. Such treatment produced no weakening or discoloration of the film surface and in addition, the treated surface was sufficiently polar to be wet by water. Besides bonding to the class of halogenated polyethylenes listed above, the N,N diallyl melamine molecules contain reactive groups useful for bonding with a wide range of adhesives. The adhesion of pretreated halogenated polyethylenes by conventional adhesives to the following materials was accomplished: polymethyl methacrylate, polymethyl alpha chloro acrylate (sold under the trade name of Gafite), glass, wood and various metals including aluminum. Iron, copper, magnesium, nickel, tin, lead, etc., and a multiplicity of alloys may also be bonded to polychlorotrifluoroethylene and the other fluorine containing halogenated polyethylenes described by the teachings embodied in the present invention.

In reacting an amine with a surface of polychlorotrifluoroethylene, it is necessary to reflux the amine and the halogenated polyethylene for ½–8 hours depending on the amine in an alkaline solution, for example, NaOH. No appreciable amount of amine is used up in the reaction, but NaOH alone has been ineffective.

Adhesion obtained by the use of this procedure is far superior to that resulting from any adhesive developed to date. Adhesion is excellent at $-15°$ F.

The extreme simplicity of this process renders it extremely adaptable to commercial practice. Commercially available adhesives are used and adhesion to any surface is possible.

A typical mechanism by which the amine reaction takes place is believed to be as follows:

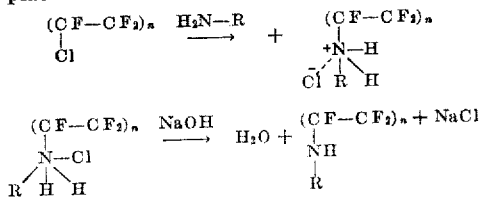

In treating the surface of a film of one of the suitable halogenated polyethylenes with adhesives of limited polarity such as Butyl rubber and various acrylates, methacrylates, etc., use is made of the characteristic of substances of similar polarity to bond to each other. These materials are believed to provide adhesion by means of their ability to bond on the one hand to the non-polar fluorinated halogenated polyethylenes and to adhere to polar substances by means of polar bonding on the other hand. In other words, these substances are suitable as adhesives. The utilization of these substances as adhesives produces sufficient adhesion to report in passing, but the results obtained with the treatments involving substances provided with amino groups are so far superior to these that the latter are preferred.

The reaction that takes place when mixtures of halogen containing polymers and polyamides are applied to a surface of a fluorinated, halogenated polyethylene film is believed to provide an amine reaction at the film surface and, simultaneously, a bond thereto. The free end of the amine is bonded to a halogenated polymer which provides the bond for the other substance to which the film is to be applied. To oversimplify the explanation, these mixtures provide suitable adhesion by combining the surface modifying characteristics of amines with the adhesive characteristics of the halogenated polymers in various compatible mixtures, thereby enabling adhesion to be accomplished in a single application. This treatment provides better adhesion than the use of the so-called non-polar adhesives.

It has been discovered that the time required for the treatment can be reduced to minutes by raising the temperature. However, certain substances are subject to damage at the temperatures required for speedy treatment. These substances include Gafite and aluminum. However in lieu of raising the temperature, irradiation by ultraviolet light during the treatment also accelerates the desired process.

In the work with Gafite, ultraviolet light was used to accelerate the curing of some samples at room temperature. Bonding of Trithene to polymethyl methacrylate and aluminum was also improved by the use of ultraviolet radiation. The incorporation of diacetyl, as a photosensitizer, hastens the adhesion of Trithene to all of the above materials. Any other suitable photosensitizer may be substituted. Thus, by using ultraviolet radiation for curing Trithene, bonding of Trithene to various materials may be accomplished satisfactorily utilizing polymerizable adhesives.

Ultraviolet irradiation is necessary to secure adhesion to aluminum and accelerates all other adhesions. The concentration of amine solution to be utilized, the duration of the treatment and the temperature at which the treatment takes place may be modified to insure that the treatment is limited to the surface only. Since a plurality of substances are suitable for use in modifying the surfaces of the class of halogenated ethylenes listed above, no general rule may be stated for the treatment in view of the wide range of characteristics present in the various products capable of reacting with the halogenated polyethylenes. Care should be taken to modify the more reactive amines by dissolving in non-reactive solvents, lowering the temperature of reaction and/or adjusting the reaction time so that the reaction is limited to a surface reaction.

The following experiments were performed to test the suitability of various treatments. In the description of the following examples, parts by weight should be assumed unless otherwise specified.

I

A solution of 25% by weight of 2-vinyl pyridine (in benzene) was refluxed for ½ hour with Trithene at its refluxing temperature. This treatment also plasticized the Trithene. When Trithene was reacted with 100% 2-vinyl pyridine, a dark, viscous material resulted. This experiment demonstrated the feasibility of modifying the more reactive amines to limit the reaction to the Trithene surface.

II 1 part of Trithene was treated with 4 parts by weight of diallyl melamine and 5 parts of concentrated NaOH solution. An adhesive comprising a prepolymer of 99.9% of methyl methacrylate and 0.1% of diacetyl by weight was prepared and used to bond the treated Trithene to Lucite at room temperature by ultraviolet irradiation for 10 hours by a 500 watt ultraviolet lamp separated from the irradiated surface by eight inches.

III 3 samples of Trithene strips were refluxed in diethanol amine for 15, 30 and 45 minutes, respectively by dipping. The samples were removed, washed and dried and adhered to Gafite by isocyanate adhesives. Some adhesion resulted.

IV

The same experiment as above was performed, except that hexamethylene diamine was substituted for the diethanol amine. No adhesion resulted. It is believed that this failure to bond resulted from the double bond formed between the amine used resulting in a brittle rather than a flexible bond.

V

Various samples of Trithene were treated with various long chain synthesized diamines dissolved in ethylene glycol for 1½, 2, 2½ and 3 hours. These were adhered to Gafite by means of a diisocyanate adhesive. Some adhesion was obtained. Those samples treated for 3 hours showed slightly better adhesion than the others.

VI

Four parts by weight of diallyl melamine and one part of Trithene film were added to five parts of NaOH dissolved in a minimum of $H_2O$. This mixture was refluxed for ½ to 18 hours and the Trithene film removed, washed and dried. The final film of some samples was also washed with HCl solution. The resulting films were extensively wet by water, whereas the original film was not wet by water. The solubility of diallyl melamine in concentrated NaOH was very slight at room temperature but was increased greatly by increasing the temperature to 110° C. By use of a 40–20 mixture of water-dioxane as the solvent, solubility of diallyl melamine was greatly increased.

VII

A similar procedure to the one disclosed in paragraph VI immediately above was used with ethanolamine being substituted for the diallyl melamine. The total immersion time was limited to from 10 to 20 minutes and the resulting treated film was wet by water indicating the introduction of adhesive properties by the amine treatment.

While the description of the invention has thus far been limited to the protection of surfaces of materials subject to corrosion by the application of a thin film of a halogenated monomer of polyethylene such as polychlorotrifluoroethylene whose surface is modified to allow it to adhere to an exposed surface of a body of material subject to corrosion, it is also contemplated that the use of halogenated polyethylenes such as polychlorotrifluoroethylene as an interlayer for laminated window closures comprising a sandwich consisting of two or more sheets of glass or some synthetic transparent resin such as Lucite, is rendered possible by the surface treatment of the halogenated ethylene such as polychlorotrifluoroethylene in the manner taught in this invention.

Such laminates prepared from amine-treated polychlorotrifluoroethylene with glass and Lucite exhibits excellent impact adhesion and shatter resistance on penetration by high velocity projectiles at temperatures ranging from —65° F. to 400° F.

Various transparent synthetic resins were laminated with surface treated sheets of polytrifluorochloroethylene (Trithene) and various adhesives listed below. This was accomplished by cutting the resinous outer layers of the laminate into ½ inch by 2 inch strips and the Trithene interlayer into slightly larger strips. The Trithene was cleaned with acetone, dried and stored in a desiccator until used.

After application of adhesive to both interlayer and Trithene, these materials were dried, assembled between glass or metal plates, clamped under slight pressure and cured. These samples were tested at room temperature by dropping a ½ pound steel ball held by an electromagnet 1 to 16 feet onto the laminate. Those samples with good impact adhesion at room temperature were again tested at —20° F. The resistance of the laminates to slippage at 300° F. was also evaluated. Additional laminates 4" by 6" containing the better adhesives were prepared and shot with high velocity .22 caliber slugs and were also tested by exposure to ultraviolet light and to accelerated weathering.

VIII

Polytrifluorochloroethylene was laminated between Lucite sheets by the following treatment. A copolymer of 6 parts beta dimethyl amino ethyl methacrylate and 4 parts ethyl acrylate was polymerized under ultraviolet irradiation for 22 hours to form a viscous solution. A small brush was used to paint the polymerized solution on a surface of 2 Lucite plates. Four coats of solution were applied on each surface and the plate allowed to dry between applications. The coated Lucite was laminated with unmodified polytrifluorochloroethylene and autoclaved at 290° F. for 4 hours at 200 pounds per square inch. The resulting laminate had a clear color and was shatter resistant at —20° F. and room temperature.

IX

The same laminating procedure was performed, except that the adhesives prepared as follows were substituted for the one above. In each case, the resulting laminate was clear and shatter resistant at —20° F. and room temperature.

5.4 grams of beta dimethyl amino ethyl methacrylate, 9 grams of methyl methacrylate and 14.4 grams of acetone were polymerized under ultraviolet irradiation for 20 hours to form an adhesive.

2 grams of ethyl acrylate, 8 grams of beta dimethyl amino ethyl methacrylate and 2 grams of benzene were irradiated for 50 hours under ultraviolet light to form a viscous adhesive.

X

One surface of each of a pair of Lucite sheets were sprayed with 5 grams per square foot of a copolymer of 20% methacrylic acid and 80% methyl methacrylate. Polytrifluorochloroethylene was refluxed for 9 hours in a mixture of 4 parts by weight diallyl melamine, 1 part by weight polytrifluorochloroethylene and 5 parts by weight concentrated NaOH solution. The treated polytrifluorochloroethylene was washed under tap water and dried in a desiccator before laminating with the sprayed Lucite for 4 hours at 300° F. at 200 p. s. i. The laminate had excellent shatter resistance to a bullet fired at room temperature.

XI

The same treatments were performed as above except the laminating process was limited to one hour. A fair shatter resistant laminate tested by firing a bullet at room temperature was obtained.

XII

The same treatment as described in experiment X was performed using water in lieu of concentrated NaOH solution in the refluxing mixture. The resulting laminate yielded results after a 4 hour lamination equal to those obtained after a 1 hour lamination with NaOH in the refluxing mixture.

XIII

Polytrifluoroethylene was refluxed in the refluxing solution described in Example X for 9 hours and a polyester adhesive commercially available as Vibrin X-1047 was applied to the surfaces of 4" x 6" glass sheets to be applied adjacent a treated Trithene interlayer. Many glass laminates were fabricated by laminating for ½ hour at 20 p. s. i. and 230° F. followed by 4 hours at 325° F. No delamination was observed in laminates shot at temperatures ranging from —65° F. to 400° F. However, a laminate tested by dropping a hammer on it at —65° F. broke into pieces.

XIV

Glass laminates similar to those described in Example XIII were fabricated, except that 2-vinyl pyridine was substituted for the diallyl melamine in the refluxing solution. The resulting laminate showed no delamination in response to subjection to both high velocity (bullets) and low velocity projectiles (dropped hammer) over the entire temperature range (—65° F. to 400° F.). However, the laminate exhibited some discoloration which affected its transparency somewhat. It was concluded that the addition of 2-vinyl pyridine to polytrifluorochloroethylene improved the impact strength of the latter, especially at low temperatures. At 90° C. the tensile strength of the treated Kel-F is less than that of the untreated material, but elongation at rupture and flexibility are improved considerably.

XV

Polytrifluorochloroethylene was refluxed in the refluxing mixture of Example X for 9 hours and an adhesive of 40 parts by weight of methyl methacrylate, 5 parts by weight of methacrylic acid and 5 parts by weight of crotonic acid to which 0.1% by weight of diacetyl was added was applied to a sheet of aluminum. The two surfaces were adhered by irradiating with ultraviolet for 20 minutes from a 275 watt sun lamp while opposing the surfaces under contact pressure. The laminations were completed by further irradiation of some samples, heating other samples and allowing other samples to stand around at room temperature. Both heating and additional irradiation accelerated the hardening of the adhesive. No laminates with aluminum were formed without some ultraviolet irradiation.

VXI

A sheet of polytrifluorochloroethylene was treated with pure triethylene tetramine at 300° F. The treated surface was then reacted with methacrylyl chloride. One surface of each of a pair of Lucite sheets were coated with an adhesive solution of 20% Hycar 4001 in ethyl acetate. The treated polytrifluorochloroethylene was laminated to Lucite at contact pressure for 2½ hours at 100° C. Adhesion was excellent.

XVII

A mixture containing:

11 parts by weight Hycar P–A 4001 (a chlorinated rubber-copolymer of ethyl acrylate and 2-chloro vinyl ether)
2 parts by weight triethylene tetramine
89 parts by weight ethyl acetate was applied to the surfaces of a sheet of polytrifluorochloroethylene by dipping the latter and allowing the excess to run off. This sheet was laminated between a pair of Lucite sheets under slight pressure for 2 hours at 300° F. The adhesion was perfect.

XVIII

The same treatment as above resulted in similar results, except that the dipping solution used contained:

11 parts neoprene KNR (polychloroprene)
1 part triethylene tetramine
89 parts ethyl acetate

XIX

An acetone solution containing 20% of beta chloro ethoxy ethyl methacrylate plus 1% benzoyl peroxide was polymerized by heating for 4½ hours at the boiling point of acetone. The resulting polymer was purified by precipitation three times from a methanol-acetone mixture. The monomer remained in solution and the polymer precipitated out. A solution containing:

½ gram of the above prepared polymer
2 grams methylene dichloride
0.1 gram triethylene tetramine was prepared. Polytrifluorochloroethylene sheets were dipped in the above solution and laminated with both Lucite and Gafite for 4 hours at 300° F. Excellent lamination resulted in all cases.

XX

A 5 mil thick film of polytrifluorochloroethylene was immersed in a concentrated (30% by weight) NaOH solution containing 1% $CaCl_2$ and the mixture refluxed. Small portions of N,N diallyl melamine were added every 30 minutes until 10 grams per liter of solution was added. Refluxing at about 110° C. was continued for 3 to 8 hours. The resulting films were cooled in solution to about 90°, removed, and washed immediately without scrubbing in sufficient cold water to remove any adhering particles. These films were then dried and stored in a desiccator until used. Various samples were laminated to Lucite, Gafite, glass and aluminum as follows:

A. Lucite

The following adhesives were applied to the Lucite surfaces:

|  | Adhesive A, Parts by weight | Adhesive B, Parts by weight |
| --- | --- | --- |
| Terpolymer of Methyl Methacrylate | 7 | 8 |
| Methacrylic Acid | 2 | 1 |
| Crotonic Acid | 1 | 1 |
| Diacetyl | 0.1 | 0.1 |

Lamination was accomplished in an autoclave at temperatures between 275° F. and 325° F. for ½ hour at 200 p. s. i. The laminate was subsequently cured by ultraviolet irradiation for 3 hours at 1½ feet with a 275 watt sun lamp.

B. Gafite

An adhesive of 80 parts by weight chloroethyl methacrylate, 20 parts by weight methacrylic acid and 0.1% of the total weight of diacetyl was used. Lamination was accomplished with only slight contact pressure by ultraviolet radiation on both sides of the laminate for 3 hours at 1½ feet with a 275 watt sun lamp followed by 30 minutes at 100° C.

C. Glass

The adhesive applied to the glass comprised 80 parts by weight of Vibrin 1047 supplied by the Naugatauck Co., 20 parts by weight of methacrylic acid and 0.1% of diacetyl. Lamination was accomplished with only slight contact pressure by ultraviolet radiation on both sides of the laminate for 5 hours with a 275 watt sun lamp at one foot and one hour heat treatment at 150° C.

D. Aluminum

One adhesive applied comprised 90 parts by weight of a copolymer of butyl methacrylate, 10 parts by weight of methacrylic acid and 0.1% by weight of diacetyl. Lamination was accomplished by irradiating for one hour with ultraviolet radiation from a 275 watt sun lamp at 1½ feet and a 15 minute heat treatment at 100° C.

The above treatment was performed to laminate another specimen except that the adhesive applied in this latter case consisted of 30 parts terpolymer of methacrylic acid, 15 parts crotonic acid, 105 parts methyl methacrylate and 0.1% by weight of diacetyl.

XXI

A 40–5–5–100 mixture of methyl alpha chloroacrylate, methacrylic acid, crotonic acid and 1,2,3 trichloropropanol were refluxed one hour and the solution was applied to Gafite and to diallyl melamine treated polytrifluorochloroethylene. After drying and laminating for two hours at 155° C., the adhesion was found to be considerable. Lamination at lower temperatures was ineffective.

We have found that fluoro halo polymers react with amines. By use of compounds with a plurality of amino groups, it is possible to affix free amino groups to the surface. If the amine also contains polymerizable double bonds, these may later be polymerized. Thus, when polytrifluorochloroethylene is treated with diallyl melamine, and a methyl alpha chloroacrylate methacrylic acid copolymer is used as the adhesive, an excellent bond is established between Gafite and the amine-modified polytrifluorochloroethylene. It is believed that the acidic portion reacts with the free amino groups on the polytrifluorochloroethylene surface, while the alpha chloroacrylate residue possesses a natural adhesion to the Gafite surface. This view is supported by the fact that adhesion is nil when 2-vinyl pyridine-treated polytrifluorochloroethylene is used in the laminate. In the latter case, no free amino groups would be present on the surface.

Any unsaturated acid, isocyanate or H-reactive compound could be used in lieu of methacrylic acid. Combinations of these compounds may also be used. Also, any monomer whose polymer possesses adhesion to Gafite could be used in lieu of the methyl alpha chloroacrylate. Furthermore, any amine containing a plurality of amino groups or one amino group plus hydroxyl, sulfhydryl etc. groups could be used in place of the diallyl melamine. Any chloro-fluoro polymer could be used in the above scheme as the inner layer material.

The following materials were also tested and the results indicated these materials unsuitable for modifying polytrifluorochloroethylene surfaces:

Araldite AN–102 (Ciba)
Acryloid A–101 (Rohm & Haas)
Glyptal 1276 (General Electric)
Cycleweld C–14 (Chrysler)
Epon 1062 (Shell)
Epon RN–94 (Shell)
Polyamide Resin 93 (General Mills)
Polyamide Resin 50 (General Mills)
Selectron 5208 (Pittsburgh Plate Glass)
Selectron 5200 (Pittsburgh Plate Glass)
N1 (Pittsburgh Plate Glass)

G92 (Pittsburgh Plate Glass)
Y-8 (Pittsburgh Plate Glass)
Veloform F (Firestone)
Saran F-120 (Dow)
Saran F-118 (Dow)
Neoprene KNR (Du Pont)
Rez-n-glue (Schwarts)
Poly n-butyl methacrylate
Poly n-octyl methacrylate
Poly n-octyl acrylate
Poly 2-ethyl hexyl acrylate
Poly isobutyl acrylate
Divinyl benzene-hexylmethacrylate copolymers
Allyl trifluoro acetate
Allyl perfluoro butyrate
P-trichloro tertiary butyl alcohol
Vinyl trifluoro acetate
Diallyl perfluoro succinate
Difluoro dichloro ethylene polymers
Vinylidene fluoride copolymers with acrylates and methacrylates
Copolymers of ethyl acrylates and beta-chloroethyl acrylate
Poly beta-chloroethoxy ethyl methacrylate
Poly heptafluorobutyl acrylate
Poly tetrahydrofurfuryl acrylate
Triallylcyanurate From the results of the above and other experiments, it was concluded that amine treatments provided the most suitable method of rendering various halogenated fluorinated ethylenes suitable for bonding to other materials, the aminechlorinated polymer mixtures also provided suitable adhesives and so did the phosphite treatments.

The teachings of the present invention make possible the use of the halogenated and fluorinated polyethylenes listed above as protective coatings for containers for corrosive liquids, a typical example of which is depicted schematically in cross-section in Figure 3. Other suggested uses include protective coatings for bodies to be exposed to the effects of wind, weather, temperature variations, etc., in laminates where sheets of the non-polar substances comprise the outer sheets and in laminates where a film of one of the non-polar substances comprises a thin interlayer, such as a safety window.

It is understood that the specific embodiments listed above have been described for illustration only and do not constitute the scope of the present invention, reference to the latter being contained in the accompanying claims.

What is claimed is:

1. An article of manufacture comprising a film produced by reacting a film of polymeric material having the general formula $(-C_2F_nX_{4-n}-)_m$, where $m$ equals a positive, plural integer, $n$ equals 2 or 3 and X is a halogen other than fluorine, with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures, and a layer of material subject to corrosion having a continuous surface adhesively bonded to said film.

2. The article of claim 1 wherein the polymeric material is polytrifluoromonochloroethylene.

3. The article of claim 1 wherein the amino substance is diallyl melamine.

4. The article according to claim 1, wherein the amino substance is 2-vinyl pyridine.

5. A method of bonding a sheet of polymeric material having the general formula $(-C_2F_nX_{4-n}-)_m$, where $m$ equals a positive, plural integer, $n$ equals 2 or 3 and X is a halogen other than fluorine, to a base having a continuous surface composed of a material subject to corrosion comprising reacting a surface of said sheet with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures, applying an adhesive to one of said surfaces and maintaining the surfaces in juxtaposition until the bond is cured.

6. The method according to claim 5, wherein the amino substance is incorporated in an alkaline solution.

7. The method according to claim 5 wherein the surfaces are maintained in juxtaposition in the presence of ultra-violet radiation.

8. A container for corrosive agents comprising a body forming the bottom and sides of said container and a protective coating of a sheet of polymer having the general formula $(-C_2F_nX_{4-n}-)_m$, where $m$ equals a positive, plural integer, $n$ equals 2 or 3 and X is a halogen other than fluorine, adhesively bonded to at least the inner surface of said body, the surface of said coating facing said inner surface being composed of the reaction product of the sheet with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures.

9. The article according to claim 8, wherein the sheet is composed of polytrifluoromonochloroethylene.

10. A laminated structure comprising a plurality of relatively thick sheets of material having continuous inner surfaces, a relatively thin sheet of a polymeric material having the general formula $(-C_2F_nX_{4-n}-)_m$, where $m$ equals a positive, plural integer, $n$ equals 2 or 3 and X is a halogen other than fluorine, between said inner surfaces, said thin sheet having a continuous surface chemically treated with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures, said continuous surfaces being adhesively bonded at their interfaces.

11. A laminated structure comprising a plurality of relatively thick sheets of rigid, transparent material having continuous inner surfaces, a relatively thin sheet of polymeric material having the general formula $$(-C_2F_nX_{4-n}-)_m$$

where $m$ equals a positive, plural integral, $n$ equals 2 or 3 and X is a halogen other than fluorine, between said inner surfaces, said thin sheet having a continuous surface chemically treated with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures, said continuous surfaces being adhesively bonded at their interfaces.

12. A laminated structure comprising a first sheet of material having continuous surfaces, a relatively thin sheet of polymeric material having the general formula $$(-C_2F_nX_{4-n}-)_m$$

where $m$ equals a positive, plural integer, $n$ equals 2 or 3 and X is a halogen other than fluorine, having a continuous surface chemically treated with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures, facing each continuous surface of said first sheet, said continuous surfaces being adhesively bonded at their interfaces.

13. A laminated assembly comprising a sheet consisting essentially of a substance from the class consisting of metals and metal alloys having a continuous surface, and a relatively thin sheet of polymeric material having the general formula $(—C_2F_nX_{4-n}—)_m$, where $m$ equals a positive, plural integer, $n$ equals 2 or 3 and X is a halogen other than fluorine, having a continuous surface adhesively bonded to said continuous surface of the first sheet, said surface of the polymeric material nearest said continuous surface of the first sheet being composed of the reaction product of the polymer with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures.

14. A laminated article in the form of a sheet comprising a film consisting essentially of the reaction product of polytrifluorochloroethylene with diallyl melamine and a layer of material subject to corrosion having a continuous surface adhesively bonded to said film.

15. A laminated article in the form of a sheet comprising a film consisting essentially of the reaction product of polytrifluorochloroethylene with an alkaline solution containing diallyl melamine and a layer of material subject to corrosion having a continuous surface adhesively bonded to said film.

16. A laminated article in the form of a sheet comprising a film consisting essentially of the reaction product of polytrifluorochloroethylene with 2-vinyl pyridine and a layer of material subject to corrosion having a continuous surface adhesively bonded to said film.

17. The laminated assembly according to claim 13, wherein the polymeric material is polytrifluoromonochloroethylene.

18. The laminated assembly according to claim 13, wherein the amino substance is diallyl melamine.

19. The laminated assembly according to claim 13, wherein the amino substance is 2-vinyl pyridine.

20. The laminated assembly according to claim 13, wherein the continuous surface adhesively bonded to the continuous surface of the first sheet is the reaction product of polytrifluoromonochloroethylene and diallyl melamine.

21. The laminated assembly according to claim 13, wherein the substance is aluminum.

22. The laminated assembly according to claim 13, wherein the substance is magnesium.

23. A laminated assembly comprising a pair of glass sheets having continuous inner surfaces, a relatively thin sheet of polymeric material having the general formula $(—C_2F_nX_{4-n}—)_m$, where $m$ equals a positive, plural integer, $n$ equals 2 or 3 and X is a halogen other than fluorine, between said inner surfaces, said thin sheet having a continuous surface chemically treated with an amino substance taken from the class consisting of polymerizable, ethylenically unsaturated amino compounds, hydroxy alkyl amines, amines containing a number of ethylene groups and said number plus one amino groups, diamino alkanes having at least one terminal $CH_3$ group, and polyamino compounds in halopolymer mixtures, said continuous surfaces being adhesively bonded at their interfaces.

24. The laminated assembly according to claim 23, wherein the polymeric material is polytrifluoromonochloroethylene.

25. The laminated assembly according to claim 23, wherein the amino substance is diallyl melamine.

26. The laminated assembly according to claim 23, wherein the amino substance is 2-vinyl pyridine.

27. The laminated assembly according to claim 23, wherein the chemically treated continuous surface is the reaction product of polytrifluoromonochloroethylene and diallyl melamine.

References Cited in the file of this patent

UNITED STATES PATENTS

| | | |
|---|---|---|
| 2,459,721 | Poltorak | Jan. 18, 1949 |
| 2,484,484 | Berry | Oct. 11, 1949 |
| 2,705,691 | Panagrossi et al. | Apr. 5, 1955 |

FOREIGN PATENTS

| | | |
|---|---|---|
| 660,398 | Great Britain | Mar. 28, 1949 |

OTHER REFERENCES

Industrial and Engin. Chem., page 2133, October 1949.
Plastics, July 1946, pp. 32, 34 and 97.
Modern Plastics, October 1948, pp. 168, 170 and 172.
Gladstone, Ind. Eng. Chem., 45, No. 7, 1555–1558, July 1953. (Note the abstract in Am. Chem. Soc. 122 meeting, "Abstract of Paper," September 14–19, 1952, Division of Polymer Chemistry, page 3Q.)

UNITED STATES PATENT OFFICE

CERTIFICATE OF CORRECTION

Patent No. 2,788,306                                          April 9, 1957

Robert P. Cox et al.

It is hereby certified that error appears in the printed specification of the above numbered patent requiring correction and that the said Letters Patent should read as corrected below.

Column 12, line 54, for "integral" read -- integer --.

Signed and sealed this 7th day of January 1958.

(SEAL)
Attest:

KARL H. AXLINE
Attesting Officer

ROBERT C. WATSON
Commissioner of Patents